United States Patent [19]

Frantom et al.

[11] Patent Number: 4,741,555
[45] Date of Patent: May 3, 1988

[54] DOOR MOUNTED TRANSPORT MECHANISM FOR PASSIVE THREE POINT SAFETY RESTRAINT SYSTEM

[75] Inventors: Richard L. Frantom, Richmond; Rudy V. Thomas, Sterling Heights, both of Mich.

[73] Assignee: Allied Corporation, Morris Township, Morris County, N.J.

[21] Appl. No.: 18,315

[22] Filed: Feb. 24, 1987

[51] Int. Cl.⁴ .............................................. B60R 21/10
[52] U.S. Cl. .................................... 280/804; 280/801; 280/803
[58] Field of Search ............... 280/801, 802, 804, 808, 280/803

[56] References Cited

U.S. PATENT DOCUMENTS

| | | | |
|---|---|---|---|
| 4,387,912 | 6/1983 | Moriya et al. | 280/804 |
| 4,475,745 | 10/1984 | Fohl | 280/804 |
| 4,580,813 | 4/1986 | Hashimoto | 280/804 |

FOREIGN PATENT DOCUMENTS 2261318  6/1974  Fed. Rep. of Germany ...... 280/804

Primary Examiner—Richard A. Bertsch
Attorney, Agent, or Firm—Russel C. Wells; Markell Seitzman

[57] ABSTRACT

A door mounted transport mechanism for passive three point safety restraint system for motor vehicles operates to move the restraint system from the "B" pillar to the "A" pillar of the motor vehicle when the door is opened and returning when the door is closed and the ignition system is turned on. By being mounted in the vehicle door, the restraint system is fabricated and assembled as a subassembly and moved to the vehicle assembly line in a complete condition. Occupant convenience is obtained by the positioning of the rear anchoring positions on the door which puts them more outboard than in a convention pillar mounted system.

20 Claims, 2 Drawing Sheets

DOOR MOUNTED TRANSPORT MECHANISM FOR PASSIVE THREE POINT SAFETY RESTRAINT SYSTEM

FIELD OF THE INVENTION

This invention relates to a safety restraint system for motor vehicles and in particular to passive three point seat belt sytems mounted in the vehicle door.

BACKGROUND OF INVENTION

Prior Art

Passive restraint systems for motor vehicles take many forms—from the air bag, to the motorized two point shoulder system, to the inflatable seat belt. At the present time in two point passive belt installations, a lap belt is recommended which is typically a non-passive component in that the vehicle occupant must put it on.

An example of the motorized two point shoulder system is U.S. Pat. No. 4,313,622 issued to Suzuki et al and entitled "Passive Seat Belt System". In that system, one end of the shoulder belt is moved along a rail in the roof of the vehicle over the door and the other end is fixed at a point at or near the middle of the vehicle. Another example is U.S. Pat. No. 4,354,696 issued to Volk et al. and entitled "Device For Passive Actuation of a Safety Belt".

An example of the inflatable seat belt is U.S. Pat. No. 3,970,329 issued to Lewis and entitled "Inflatable Band Restraint Stitching" which is assigned to a common assignee. In that patent, both a shoulder and a lap belt are provided, but it is not a passive system in that the vehicle occupant must put it on. During a crash situation, the belt inflates in a manner similar to an air bag.

U.S. Pat. No. 4,363,501 issued to Takada and entitled "Passive Type Vehicle Occupant Restraint Belt System" describes an improvement in the reduction device between an electric motor and the transfer wire to move the belt. This patent further illustrates a three point passive system wherein the shoulder belt is fixedly attached to one end thereof to the upper rear corner of the vehicle door, opposite the hinge edge, and at the other end to a door-mounted retractor located at the lower rear corner of the vehicle door. The shoulder belt passes through a D-ring connected to a lap belt and through a moveable slide mounted in a track on the door. As the door is opened, the slide moves from the lower rear corner of the door to a position on the door near the door hinge edge.

Other than the system described in U.S. Pat. No. 4,363,501, at least one part of the system is a non-passive system. In the U.S. Pat. No. 4,363,501, the lap and shoulder belts are passively placed around the occupant, but passenger convenience is missing. The shoulder belt, is in the way when the door is opened for entering or leaving the vehicle. In addition, the racked wire for moving the lap belt must be stored in the door after it passes the motor and be capable of being freely played out.

SUMMARY OF THE INVENTION

It is a principle advantage of the invention to provide a passive three point restraint system.

It is another advantage of the invention to improve the occupant convenience during the ingress and egress from the motor vehicle having a passive three point restraint system by having a high forward position of the lap belt when the door is open.

It is yet another advantage of the invention to provide a passive three point restraint system of a modular construction to reduce vehicle assembly costs.

These and other advantages will become apparent in a door mounted passive restraint system for motor vehicles having a door mounted track means with a shoulder belt portion and a lap belt portion, a slider means in each shoulder belt portion and the lap belt portion. The shoulder belt slider provides the anchor means for the shoulder belt and is operable to move the shoulder belt from a position away from the vehicle occupant during ingress and egress of the vehicle to a position securing the occupant in the vehicle when the door is closed. The lap belt slider providing the anchor means for the lap belt is operable to move the lap belt from a position away from the vehicle occupant during ingress and egress of the vehicle to a position restraining the occupant when the door is closed. A flexible transport member is connected to both the shoulder belt slider and the lap belt slider and driven by a motor mounted in the door.

Many other objects and purposes of the invention will be clear from the following detailed description of the drawings.

DETAILED DESCRIPTION

Figure 1:
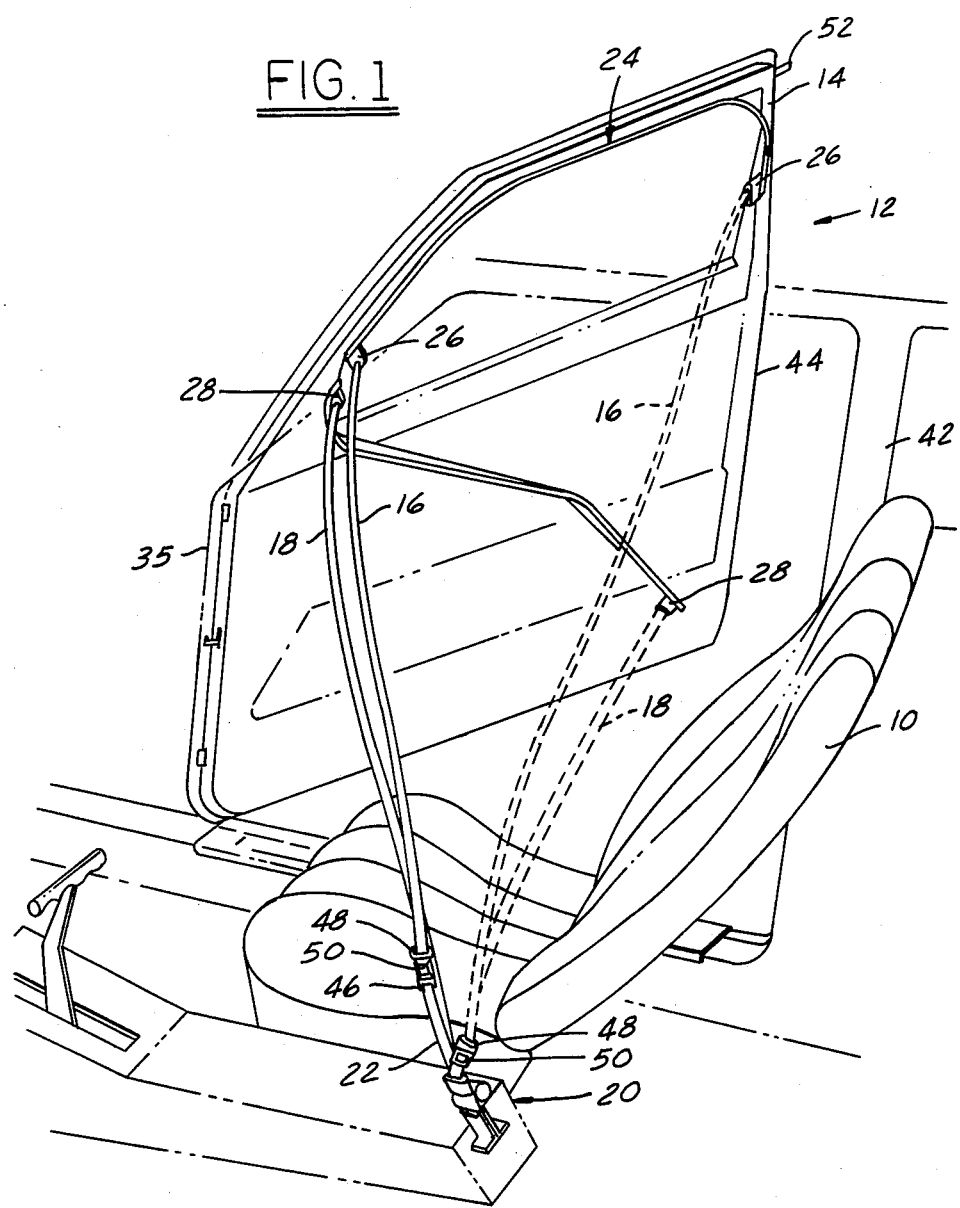
FIG. 1 is perspective view of the passive three point restraint system.

In FIG. 1 there is illustrated the right front seat 10 of a motor vehicle with the passive three point restraint system 12. It is to be understood, that this system is adaptable to various seat positions in the motor vehicle. The door 14 is shown in an open position for either ingress or egress of the vehicle occupant. In the FIGURE, the positions of the shoulder belt portion 16 and the lap belt portion 18 of the restraint system 12 are illustrated with the solid lines showing the position with the door 14 open and the dotted lines showing the position with the door 14 closed.

Positioned at the left of the seat 10 and in the well known position is a belt retractor means 20 on which belt means 22 controlling the length of both the shoulder belt portion 16 and the lap belt portion 18 of the restraint system 12 are wound.

Secured to the vehicle door 14 is a track system 24 for the movement of the both the shoulder belt 16 and lap belt 18 portions of the restraint system 12. The track system 24 comprises a pair of sliders; a shoulder belt slider 26 and a lap belt slider 28. Operatively connecting the sliders 26, 28 is a flexible transport member 30 which may be either a flat tape or a cable. If the flexible transport 30 member is a flat tape, for ease and sureness of driving the tape, the tape may have a plurality of sprocket holes extending in a direction along its length. The transport member 30 is wound around a pulley 32 on a electric motor means 34 mounted in and to the frame of the door 14. If the flexible transport member 30 is a flat tape with the sprocket holes, then the pulley 32 on the armature of the motor 34 is a sprocket. However, if the flexible transport member 30 is a flat tape without the sprocket holes or is a flexible cable having a circular or rounded cross-section, one end of the member 30 is affixed to a spiral pulley 32 which moves the flexible transport member 30 and functions as a storage drum.

When a person wants to exit from the vehicle, the door 14 is opened and the motor means 34 drives both sliders 26,28 forward to the "A" pillar 35, with respect to the vehicle, to first and third anchoring positions respectively of the shoulder 36 and lap 38 portions of the track system 24. In this position, the belts are out of the way. The first and third anchoring positions of the track system are located adjacent to and along the hinge or forward edge 40 of the door 14. The first and third anchoring positions of the track system 24 may be adjacent to each other.

Depending on the control system used, once the person sits down on the seat 10, closes the door 14 and turns the ignition key on, the motor 34 operates and the transport member 30 moves the pair of sliders 26,28 from their first and third anchoring positions to a second and fourth anchoring positions respectively near the "B" pillar 42 on the track system 24. The second and fourth anchoring positions of the track system 24 are adjacent to the edge 44 of the vehicle door 14 opposite the hinge edge 40 which is the trailing or rearward edge of the door. The retractor means 20, which maybe electrically controlled, operates to put tension into the belt system by snuggling up the belts 16,18 to the occupant.

The second anchor position of the shoulder belt slider 26 is also advantageously positioned for occupant comfort. When the shoulder belt portion 16 returns to position itself about the occupant, the second anchor position being further outboard of the seat 10 than if it was mounted in the vehicle body, positions the shoulder belt portion 16 away from the face of the occupant. In this manner the shoulder belt portion 16 will not rub on the face of the occupant during its return to the normal restraining position which are the second and fourth anchor positions.

In the one embodiment, the retractor means 20 is a dual spool retractor wherein the shoulder belt portion 16 of the belt means is wound around one spool and the lap belt portion 18 is wound around the other spool. In this configuration, each belt portion is separate. In another embodiment, the retractor means 20 is a single spool retractor and one end of the occupant position portion 46 of the belt means 22 is connected to the spool. At the other end of the occupant position portion 46 of the belt means 22 has a junction or "D" ring 48 adapted to slideably receive through the opening of the "D", the shoulder belt portion 16 and the lap belt portion 18 of the belt means. In such a configuration, the shoulder belt portion and the lap belt portion are opposite ends of a continuous belt.

For the purposes of emergency release of the restraint system, both sliders 26,28 may have a receptacle means and one end of the corresponding shoulder belt portion and lap belt portion each are fixed to the receptacle means. When a dual spool retractor is used, a spool release mechanism may be used to disengage the retractor locking mechanisms from the spools. When a single spool is used, a similar feature may be provided or the junction ring 48 may be adapted to a buckle release 50 attached to the single spool retractor webbing. In the interests of safety, the control system can provide a warning or an alarm system to the vehicle operator when the restraint system 12 is disabled because either of the junction ring 48 and the receptacle means 50 are unbuckled, or the spool release mechanism is engaged.

Figure 2:
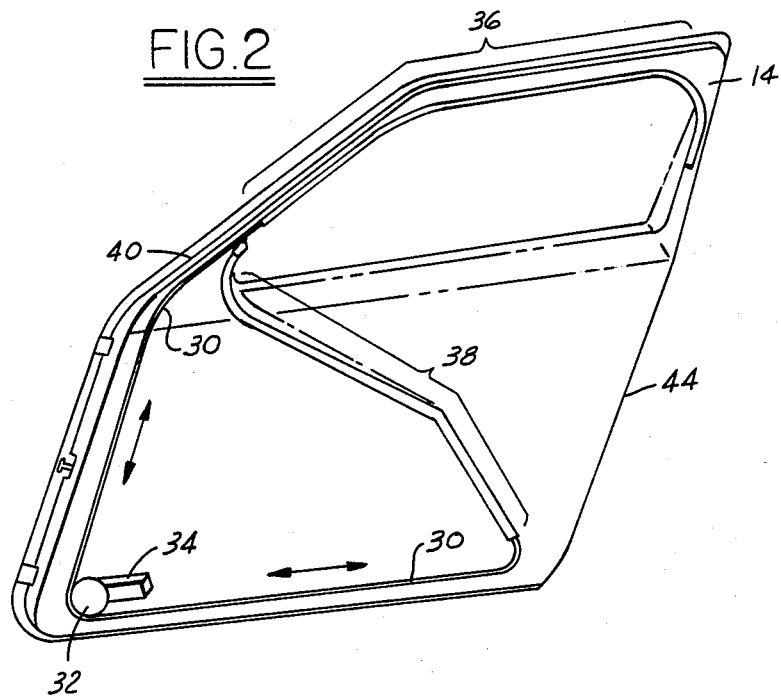
FIG. 2 is a plan view of a vehicle door illustrating the respective locations of the track and the motor using more than one transport member.

Referring to FIG. 2, the positioning of the slider track and the motor 34 with the flexible transport member 30 on the door 14 frame is illustrated. The track containing the flexible transport member 30 may be separately fabricated and attached to the door or formed from the present metal of the door. However in either configuration, the travel distance for the lap slider 28 and the shoulder slide 26 is equal. If the travel distance is to be unequal, then the pulley member 32 on the motor 34 must have two different diameters. Either way, the restraint system is constructed on the door 14 at a subassembly point and brought to the vehicle, fully assembled, at some point on the main vehicle assembly line where the doors are installed. The retractor means 20 can be installed on the seat frame or some other portion of the vehicle at a different time.

Figure 3:
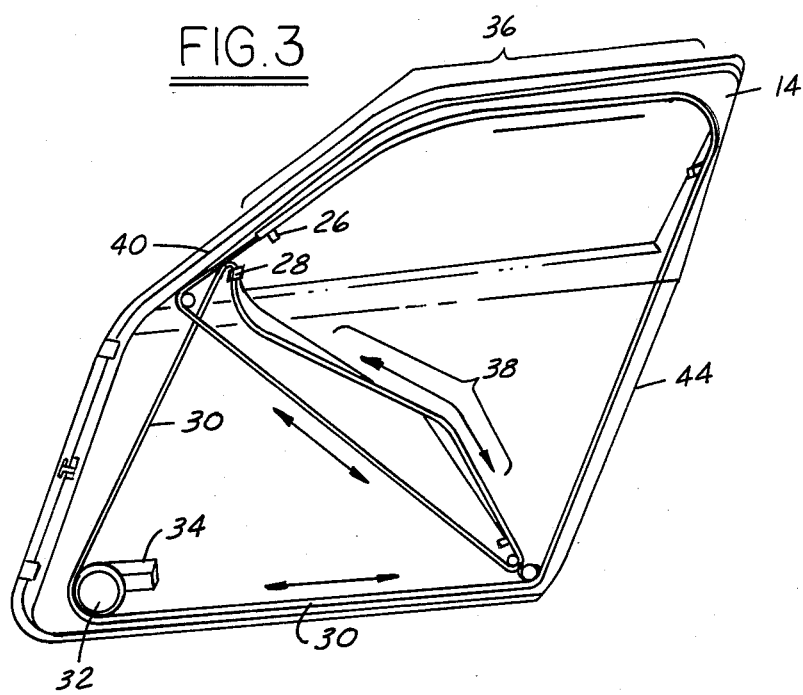
FIG. 3 is a plan view of a vehicle door illustrating the respective locations of the track and the motor using an endless loop transport member.

FIG. 3 illustrates an embodiment of the flexible transport member 30 which is an endless loop. By having an endless loop, there may be no need to provide storage space in the door for the unused portions of the flexible transport member 30 as in the prior art systems described in the Background of the Invention. The electric motor 34 is a reversible motor having a pulley means 32 connected to its armature. The pulley means 32 provides a wrapping of the flexible transport member 30 so as to have the transport member 30 move with the rotation of the armature of the motor means 34. In such a system, the shoulder belt portion 36 and the lap belt portion 38 of the track system 24 are substantially equal in length. It is necessary that the length of the endless loop of the flexible transport member 30 be such to permit both sliders 26,28 to lock into their anchor positions.

In the basic control system for the passive three point restraint system 12, the power for the system comes directly from the battery and does not require a key in the ignition system to operate. When the door 14 is open, both sliders 26,28 must be either in or returned to their forward anchor positions. This corresponds to the first and third positions which are at the "A" pillar 35 of the vehicle. A pair of limit switches, one per slider, are position to sense the presence of the sliders 26,28 at each position. Upon opening the door 14, the electric motor 34 drives the flexible transport member 30, hence the sliders 26,28 to their proper position at the "A" pillar 35. When the sliders are in position, the power to the electric motor 34 is removed.

After entering the vehicle and closing the door 14 the ignition switch is actuated and power is supplied to the motor 34 to reverse the rotation of the armature and the sliders 26,28 are returned to the rear anchor positions, second and fourth, which is near the "B" pillar 42. When the sliders 26,28 are in the rear anchor positions, the limit switches near the "B" pillar 42 open and the motor 34 is turned off. It is understood that there are many modifications of this basic system such as moving the sliders 26,28 forward when the door 14 is opened and the ignition switch is on and the vehicle is not moving.

Another feature of the control system is the position of the locking pin 52 between the door 14 and the "B" pillar 42 of the vehicle. In FIG. 1, the locking pin 52 is shown extended which, of course, is not so with the door 14 open. This locking pin 52 is urged into engagement with the "B" pillar 42 when the door 14 is closed to solidify the door to the vehicle for the transfer of any loads placed on the restraint system. The locking pin 52 can be contorlled by a sensing member sensing the movement of the vehicle beyond a certain minimum speed with the ignition switch in an on position. Thus in a crash condition, the door 14 is solidly secured to the vehicle "B" pillar 42 during the crash condition and when the vehicle speed is reduced, the locking pin 52 is disengaged allowing the door 14 to be opened.

There has thus been illustrated and described a passive three point restraint system 12 for a motor vehicle. The system provides many comfort features for the occupant such as positioning the rear anchoring point of the shoulder portion of the belt system in an outboard position thereby having the belt move in such a manner to avoid any facial contact with the occupant. With the passive three point restraint system 12 mounted on the door 14, the manufacturing cost of the system is reduced by allowing the system to be assembled on the door in a subassembly area and the door then being mounted on the vehicle in the main assembly area. Most importantly the crash protection of a three point belt system is provided with a minimal cost impact to the consumer with the convenience of a two point belt system.

Many changes and modifications in the above described embodiment of the invention can, of course, be carried out without departing from the scope thereof. accordingly, that scope is intended to be limited only by the scope of the appended claims.

We claim:

1. A door mounted passive three point safety restraint system for motor vehicles comprising:
   retractor means associated with a motor vehicle occupant seating position;
   belt means having a retractor portion connected to said retractor means and an occupant position portion having a shoulder belt portion and a lap belt portion;
   door mounted track means with a shoulder belt section mounted along the top portion of the door and a lap belt section mounted in the lower portion of the door;
   slider means mounted for movement along said track means and having a shoulder belt slider and a lap belt slider,
   said shoulder belt slider providing anchor means for said shoulder belt portion and operable to move said shoulder belt portion along said top portion of the door from a first anchor position away from the vehicle occupant and above the bottom of the window of the door during ingress and egress of the vehicle to a second anchor position securing the occupant in said occupant seating position when the door is closed,
   said lap belt slider providing a second anchor means for said lap belt portion and operable to move said lap belt portion along said lower portion of the door from a third anchor position away from the vehicle occupant and above the bottom of the window of the door during ingress and egress of the vehicle to a fourth anchor position restraining the occupant in said occupant seating position when the door is closed;
   a flexible transport member operatively connected to each of said sliders;
   motor means mounted in the door and operatively coupled to said flexible transport member; and
   control means operatively connected to said motor means for moving said transport member and said slider means between said first and second and said third and fourth anchor positions on said track.

2. A door mounted passive three point safety restraint system for motor vehicles according to claim 1 wherein said flexible transport member has a circular cross-section.

3. A door mounted passive three point safety restraint system for motor vehicles according to claim 1 wherein said flexible transport member is a flat tape.

4. A door mounted passive three point safety restraint system for motor vehicles according to claim 3 wherein said flat tape has a plurality of sprocket holes extending along its length.

5. A door mounted passive three point safety restraint system for motor vehicles according to claim 1 wherein said first and third anchor positions are along the hinge edge of the vehicle door and above the bottom of the window of the door.

6. A door mounted passive three point safety restraint system for motor vehicles according to claim 5 wherein said second anchor position is at the end of the vehicle door opposite the hinge edge and above the bottom of the window of the door.

7. A door mounted passive three point safety restraint system for motor vehicles according to claim 5 wherein said fourth anchor position is located in the lower portion of the vehicle door opposite the hinge edge.

8. A door mounted passive three point safety restraint system for motor vehicles according to claim 5 wherein said first and third anchor positions are substantially adjacent to each other along the hinge edge of the vehicle door and above the bottom of the window of the door.

9. A door mounted passive three point safety restraint system for motor vehicles according to claim 1 wherein said shoulder belt section and a lap belt section of said door mounted track means are equal in length.

10. A door mounted passive three point safety restraint system for motor vehicles according to claim 1 wherein said retractor means is a dual spool retractor wherein said shoulder belt portion of said belt means is wound around one spool and said lap belt portion of said belt means is wound around the other spool.

11. A door mounted passive three point safety restraint system for motor vehicles according to claim 1 wherein one end of said occupant position portion of said belt means is connected to said retractor means and the other end has a junction ring adapted to slideably receive said shoulder belt portion and said lap belt portion.

12. A door mounted passive three point safety restraint system for motor vehicles according to claim 1 wherein one end of said occupant position portion of said belt means is connected to said retractor means and the other end has a receptacle.

13. A door mounted passive three point safety restraint system for motor vehicles according to claim 12 wherein one end of said shoulder belt portion of said belt means has a junction ring adapted to slideably receive said shoulder belt portion and said lap belt portion and further said junction ring forms the mating portion to said receptacle.

14. A door mounted passive three point safety restraint system for motor vehicles according to claim 13 wherein said shoulder belt portion and said lap belt portion of said belt means are opposite ends of a continuous belt.

15. A door mounted passive three point safety restraint system for motor vehicles according to claim 1 wherein said second anchor position is located on the door and outboard of the seat in said occupant seating position.

16. A door mounted passive three point safety restraint system for motor vehicles according to claim 1 additionally including locking pin means positioned at the end of the vehicle door opposite the hinge edge and operable under control of said control means to be engaged in a pillar of the vehicle when said door is closed and the speed of the motor vehicle is greater than a predetermined speed.

17. A door mounted passive three point safety restraint system for motor vehicles according to claim 1 wherein said control means provides means for sensing of an occupant seated in the occupant seating position before energizing said motor means to move said flexible transport member to said second and fourth positions.

18. A door mounted passive three point safety restraint system for motor vehicles according to claim 1 wherein said flexible transport member is an endless loop member.

19. A door mounted passive three point safety restraint system for motor vehicles according to claim 18 wherein said flexible transport member is an endless loop cable member.

20. A door mounted passive three point safety restraint system for motor vehicles according to claim 18 wherein said flexible transport member is an endless loop flat tape member.

* * * * *